United States Patent [19]
NakaMats

[11] Patent Number: 5,119,256
[45] Date of Patent: Jun. 2, 1992

[54] HEAD CLEANING DEVICE FOR A FLOPPY DISK DRIVE

[76] Inventor: Yoshiro NakaMats, 1-10-1105, Minami Aoyama 5-chome, Minato-ku, Tokyo, Japan

[21] Appl. No.: 581,424

[22] Filed: Sep. 11, 1990

Related U.S. Application Data

[63] Continuation of Ser. No. 281,133, Dec. 7, 1988, abandoned.

[51] Int. Cl.⁵ .............................................. G11B 5/41
[52] U.S. Cl. ..................................... 360/128; 360/133
[58] Field of Search ............. 360/137, 128, 133, 74.6, 360/74.5; 242/198; 369/280, 282, 291, 77.2; 206/444

[56] References Cited

U.S. PATENT DOCUMENTS

| | | | |
|---|---|---|---|
| 4,550,354 | 10/1985 | Wakabayashi et al. | 360/133 |
| 4,639,813 | 1/1987 | Uno | 360/133 X |
| 4,663,686 | 5/1987 | Freeman et al. | 360/133 X |
| 4,682,257 | 7/1987 | Neuman | 360/133 X |

FOREIGN PATENT DOCUMENTS 0053063  3/1983  Japan ................................. 360/133

Primary Examiner—Andrew L. Sniezek
Attorney, Agent, or Firm—Jordan and Hamburg

[57] ABSTRACT

A head cleaning device for a floppy disc drive includes a cleaning sheet within a cartridge, the cleaning sheet being rotatable in the cartridge. At least two spaced openings are provided in the cartridge, one of the spaced openings being an opening for a read/write head of the floppy disc drive. A shutter is moveably mounted on the cartridge between an open position and a closed position, the shutter being in its closed position closing the spaced openings to thereby isolate the cleaning sheet within the cartridge and thereby protecting the cleaning sheet from dust and dirt. The shutter in its open position exposes spaced portions of the cleaning sheet juxtaposed to the spaced openings to enable application of a cleaning fluid to the spaced portions of the cleaning sheet and to provide for cleaning the read/write head when the cleaning sheet is inserted in the floppy disc drive, the cleaning fluid on the spaced portions of the cleaning sheet effecting cleaning of the read/write head by alternately washing and wiping the read/write head as the cleaning disc rotates past the read/write head.

19 Claims, 2 Drawing Sheets

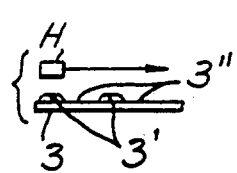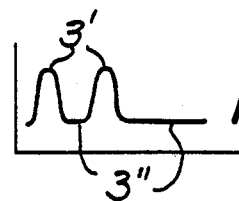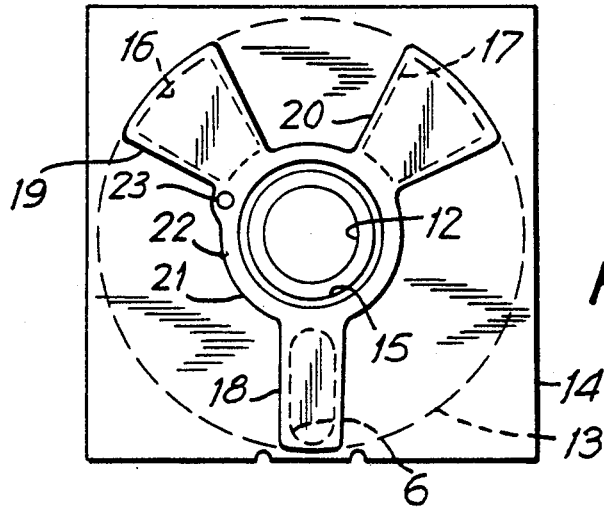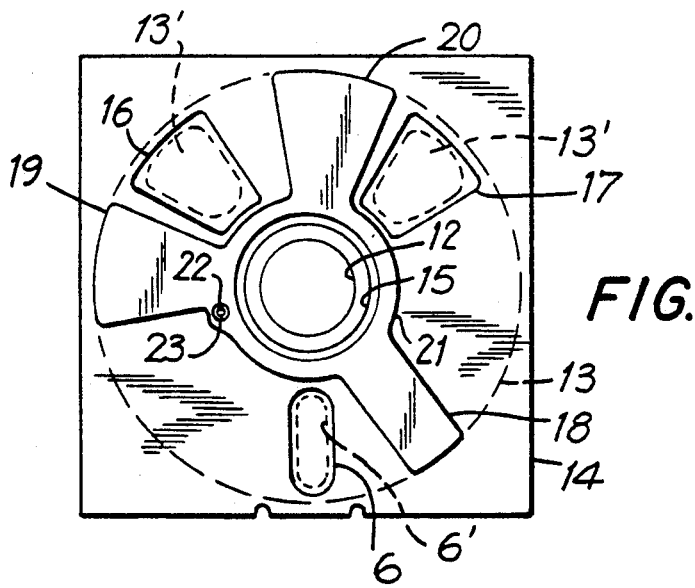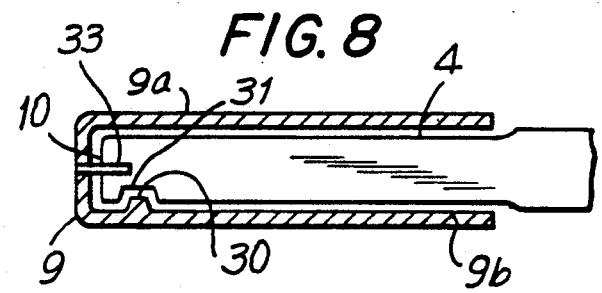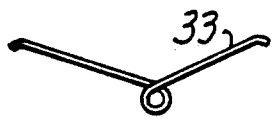

HEAD CLEANING DEVICE FOR A FLOPPY DISK DRIVE

This application is a continuation of application Ser. No. 281,133, filed Dec. 7, 1988, now abandoned.

BACKGROUND OF THE INVENTION

This invention relates to a head cleaning device for a floppy disc drive which comprises a wiping material having a circular configuration enclosed in a cartridge or jacket having a plurality of openings to receive a cleaning fluid and which are opened and closed by a shutter means.

As the magnetic head of a floppy disc drive contacts the surface of a magnetic disc rotated at high speed for recording and reproducing, magnetic particles and binder material separated from the magnetic disc by friction between the magnetic head and the magnetic layer of the disc are deposited on the drive head. As a result thereof, the gap of the magnetic head is filled and the magnetic disc and head are separated from each other, resulting in signal errors and damage to the disc surface. Therefore, it is necessary to frequently clean the surface of the drive head.

For cleaning a drive head, there is a dry cleaning method wherein sheet-like sand paper used as a cleaning disc is enclosed in a jacket which is inserted into a floppy disc drive, and the drive head is cleaned by the surface of the sheet-like sand paper cleaning disc which is rotated within the jacket. However, this system has the disadvantage of abraiding and wearing the expensive drive head.

Also there is a wet cleaning system wherein a sheet soaked with cleaning solvent in the shape of a disc is enclosed in a jacket having a window to expose a part of the cleaning disc, and after pouring cleaning solvent onto the disc through the window, the jacket is inserted into the floppy drive and rotated to wipe the drive head with the surface of the disc wet with cleaning solvent. However, this method has the disadvantage that dust easily enters into the jacket through the window and the cleaning disc within the Jacket easily becomes dirty, and in order to prevent dust entering through the window, the jacket must be enclosed in a container such as an envelope, etc., which is inconvenient for handling and makes a quick cleaning operation difficult.

This present invention entirely overcomes the disadvantages of these conventional head cleaning arrangements for floppy disc drives as set forth above.

BRIEF DESCRIPTION OF THE DRAWINGS

FIG. 5A is a side view of a cut-away section of the disc during use.

FIG. 5B is a graph showing the distribution of the cleaning solvent relative to FIG. 5A.

FIG. 6 is a plan view of a second embodiment of this invention.

FIG. 7 is a plan view showing the opened position of the shutter of FIG. 6.

FIG. 8 is a partial view, partly in cross-section, showing the shutter means on an enlarged scale.

FIG. 9 is a view of the spring for biasing the shutter means toward a closed position.

DESCRIPTION OF THE PREFERRED EMBODIMENTS

Figure 1:
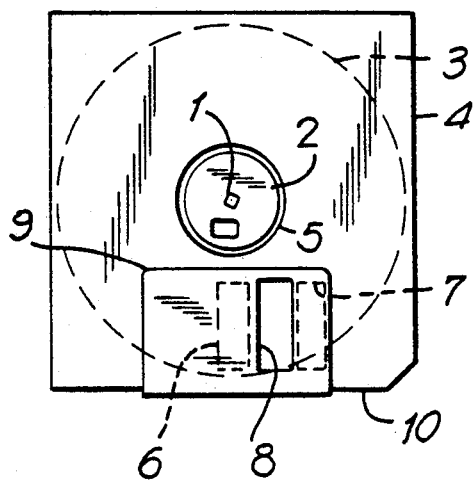
FIG. 1 is a plan view of a first embodiment of the invention.
Figure 2:
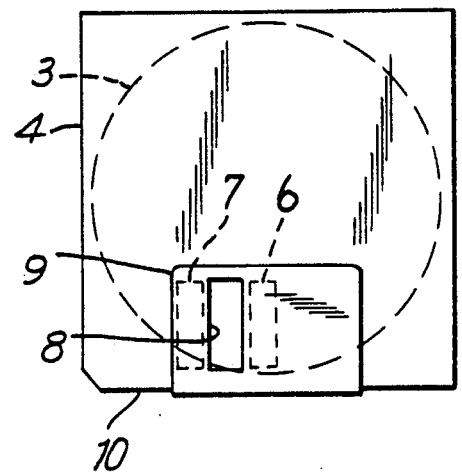
FIG. 2 is a view of the reverse side of FIG. 1.
Figure 3:
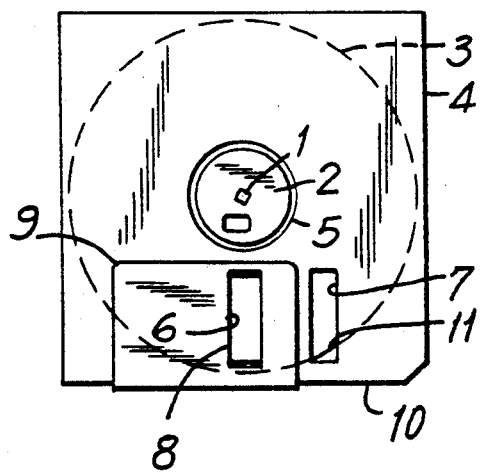
FIG. 3 is a plan view showing the opened position of the shutter shown in FIG. 1.

FIG. 1 shows one embodiment of this invention wherein a wiping material is formed into a circle from a nonwoven cloth combining synthetic fibers such as polypropylene, etc. crossing each other in order to make a cleaning disc 3 to which a hub plate 2 with an axial hole 1 is fixed. The cleaning disc 3 is enclosed in a cartridge or jacket 4 in the shape of a square thin envelope. The cartridge 4 has a hole 5 which receives hub 2, a rectangular hole 7 on one side of the cartridge and head holes 6 on both sides of the cartridge. and a shutter 9 in the shape of a plate with a hole or window 8 which is the same as or larger than holes 6 and 7. The shutter 9 is mounted across the edge 10 of cartridge 4 to slide along edge 10, and when not inserted into the floppy disc drive, as shown in FIG. 1 and FIG. 2, the shutter 9 covers holes 6 and 7 of the cartridge in that window 8 is out of alignment with holes 6 and 7 simultaneously, in order to keep the cleaning disc 3 clean in that dust does not come in or attach on the disc 3. When inserted into the floppy disc drive, as shown in FIG. 3, the shutter 9 slides to a position to expose head hole 6 which is aligned with window 8 and at the same time to expose hole 7 of the cartridge. A spring set between the edge 10 of the cartridge and shutter 9 enables shutter 9 to stop at the position shown in FIG. 1.

Figure 4:
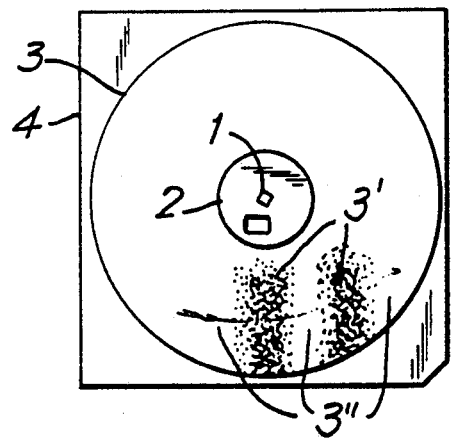
FIG. 4 is a plan view showing the cleaning disc of FIG. 1.

When using this head cleaning device, washing liquid which does not damage the cleaning disc 3 and the drive head and which also is stable at a low boiling point, such as a mixed liquid of Freon TF or isopropyl alcohol with water; i.e., a cleaning solvent, is poured and distributed on cleaning disc 3 through holes 6 and 7. By distribution at these two portions, the cleaning solvent impregnates in the direction of the circumference of the cleaning disc to obtain wet portions 3', 3' and dry portion 3" arranged alternatively as shown in FIG. 4. By preparing hole 7 to expose disc 3 to the edge 11 of disc 3, it is possible to impregnate the cleaning solvent fully to the circumference of the disc.

The cleaning device is then inserted into a disc drive and cleaning disc 3 is rotated, and at the same time, the shutter 9 is moved to the shutter opening part of the disc drive to be disposed at the position shown in FIG. 3 and the head is cleaned by contact of the head with the cleaning disc 3. On this occasion, as shown in FIG. 5, the head contacts the portions 3' 3' wet with cleaning solvent and dry portion 3" alternatively.

FIG. 5B is a graph showing the rotating direction of disc 3, shown in FIG. 5A, on a horizontal axis and disc 3's content of cleaning solvent which is the degree of wetness of the head, on a vertical axis, and showing that dirt on the head and then the dry fiber surface wiping it away alternatively. Because cleaning solvent is stable at a low boiling point, the cleaned head dries quickly, and it is possible to use the floppy disc for reading and writing information immediately after the cleaning operation.

FIGS. 6 and 7 show another embodiment of this invention showing a cleaning disc when viewed from one side. The cleaning disc 13 which has a center hole 12 to be mounted on the disc drive is enclosed within a cartridge 14 in the shape of a square envelope. The cartridge has a hole 15 larger than center hole 2, a read/write head hole 6 and holes 16 and 17, and shutter parts 18, 19 and 20 slightly larger than holes 6, 16 and 17 respectively, which are disposed around shutter ring 21, and the ring 21 being freely rotatable at the center hole 15 of cartridge 14. When not inserted in the disc drive, holes 6, 16 and 17 of cartridge 14 are entirely covered by the shutter as shown in FIG. 6 and when inserted into the disc drive, holes 6, 16 and 17 of cartridge 14 are exposed at the same time by rotating the shutter as shown in FIG. 7 so that cleaning solvent can be poured at these exposed holes. Cleaning solvent is impregnated in portions of the cleaning disc 14 such as portions 6', 13' and 13' and these impregnated surfaces of the cleaning disc wash and clean the head by rotating the disc. The head is cleaned by being exposed to the repeating alternate impregnated surfaces of the cleaning disc and the dry disc surface wiping the wet head which occurs during rotation of the disc.

This invention is epoch-making in that it has the following effects:

(1) Since the cartridge is closed tightly by the shutter to prevent penetration of dust and dirt, it is possible to always keep the cleaning disc clean.

(2) Packing materials such as an envelope, an enclosure with an opening, etc. usually used are no longer required, and handling of the cartridge becomes easy.

(3) Since a plurality of shutter parts provide openings at the same time, operation becomes quicker, and also it is possible to utilize automatic insertion into the disc drive.

(4) By pouring cleaning solvent through a plurality of holes, a wet portion with the liquid and a dry portion can be obtained on the cleaning disc, and cleaning can be effected efficiently by alternate washing and wiping the head through rotation of the cleaning disc.

Other various modifications may be utilized such as using abrasive particle coating polyester film for the material of disc 3, making the cartridge from PVC sheet by folding and sealing it instead of using injection plastic, adequately increasing or decreasing the number of holes on the cartridge, and changing the shape and the like, and all such changes and modifications are included in this invention.

FIG. 8 is a partial cross-sectional view on a greatly enlarged scale showing the shutter 9 as having a U-shaped configuration with two leg portions 9a and 9b. Guide means are provided to guide the shutter as it is moved between its open and closed position. Such guide means may include a protrusion 30 on the shutter 9 which is received in and guided in an elongated slot 31 in the cartridge. A spring 33 may be provided to bias the shutter towards its closed position. The spring 33 is mounted within the cartridge and has one extending end portion which engages the shutter 9 to thereby bias the shutter toward its closed position. By way of example, the shutter 9 may be made of sheet metal bent to the U-shaped configuration shown in FIG. 8. The window 8 is provided in each leg 9a and 9b with each window 8 being aligned with one another.

What I claim is:

1. A head cleaning device for a floppy disc drive comprising a circular cleaning sheet, a cartridge in which said cleaning sheet is disposed, said cartridge having two spaced sides, said cleaning sheet being rotatable in said cartridge between said two spaced sides, spaced openings in one side of said two spaced sides of said cartridge, each of said spaced openings being of substantially the same size and each having an outermost edge extending substantially to the outer periphery of said circular cleaning sheet, one of said spaced openings being an opening which provides access to said cleaning sheet for a read/write head of said floppy disc drive and shutter means moveably mounted on said cartridge between an open position and a closed position, said shutter means in said closed position closing each of said spaced openings in said one side of said cartridge to thereby isolate said cleaning sheet within said cartridge and thereby protect said cleaning sheet from dust and dirt, said shutter means in said open position exposing spaced portions of said cleaning sheet juxtaposed to each of said spaced openings in said one side of said cartridge to enable application of a cleaning fluid to each of said spaced portions through each of said spaced openings and to provide for cleaning the head of said floppy disc drive when the cleaning device is inserted in said floppy disc drive, said shutter means when in said open position providing access to said cleaning sheet by said read/write head through said one of said spaced openings.

2. A head cleaning device according to claim 1, wherein said cleaning sheet is a disc having a central axis, said shutter means being rotatable about said central axis.

3. A head cleaning device according to claim 2 further comprising indexing means on said shutter means and said cartridge to define the relative position between said shutter means and said cartridge when said shutter means is in said open position.

4. A head cleaning device according to claim 1, wherein said shutter means has a central ring part and arm means extending generally radially outwardly from said ring part, said arm means closing said spaced openings when said shutter means is in said closed position.

5. A head cleaning device according to claim 4, wherein said arm means comprises spaced arm parts extending generally radially outwardly from said ring part, one of said arm parts closing said one of said spaced openings when said shutter means is in said closed position, another of said arm parts closing another of said spaced openings when said shutter means is in said closed position.

6. A head cleaning device according to claim 1, wherein said shutter means is rotatably mounted on said cartridge.

7. A head cleaning device according to claim 1 further comprising guide means on said shutter means and on said cartridge for guiding said shutter means as the latter moves between said open position and said closed position.

8. A head cleaning device according to claim 1 further comprising spring means connected between said shutter means and said cartridge for biasing said shutter means toward said closed position.

9. A head cleaning device for a floppy disc drive comprising a cartridge, a circular cleaning sheet rotatably mounted about an axis within said cartridge, said cartridge having two spaced sides, at least two spaced openings in one side of said two spaced sides of said cartridge, each of said spaced openings having an outermost edge extending substantially to the outer periphery of said circular cleaning sheet, one of said spaced openings being an opening which provides access to said cleaning sheet for a read/write head of said floppy disc drive, and shutter means moveably mounted on said cartridge between an open position and a closed position, said shutter means in said closed position closing each of said spaced openings in said one side of said cartridge to thereby isolate said cleaning sheet within said cartridge and thereby protect said cleaning sheet from dust and dirt, said shutter means in said open position exposing spaced portions of said cleaning sheet juxtaposed to each of said openings in said one side of said cartridge to enable application of a cleaning fluid through each of said spaced openings to each of said spaced portions of said cleaning sheet and to provide for cleaning said read/write head of said floppy disc drive when said device is inserted in said floppy disc drive, said shutter means when in said open position providing access to said cleaning sheet by said read/write head through said one of said spaced openings, said cleaning fluid on said spaced portions of said cleaning sheet effecting cleaning of said read/write head by alternately washing and wiping said read/write head as said cleaning sheet rotates past said read/write head.

10. A head cleaning device according to claim 9, wherein said cleaning fluid is applied to said spaced portions of said cleaning sheet through each of said openings in said one of side of said cartridge when said shutter means is in said open position, said spaced openings in said one side of said cartridge being sufficiently spaced from one another such that when said cleaning fluid is applied to each of said spaced portions of said cleaning sheet through each of said spaced openings of said one of side of said cartridge, there is thereby provided on said cleaning sheet said spaced portions containing cleaning fluid separated by a section of the cleaning sheet which is dry such that said cleaning sheet effects cleaning of said read/write head by alternately washing and wiping said read/write head as said cleaning sheet rotates past said read/write head.

11. A head cleaning device according to claim 9 wherein there are three spaced openings in said cartridge.

12. A head cleaning device according to claim 9, wherein said one of said spaced openings is an elongated opening having an elongate axis radially disposed relative to the axis of said circular cleaning sheet, the other of said spaced openings being an elongate opening having an elongate axis generally parallel to the elongate axis of said one of said spaced openings.

13. A head cleaning device for a floppy disc drive comprising a circular cleaning sheet, a cartridge in which said cleaning sheet is disposed, said cartridge having two spaced sides, said cleaning sheet being rotatable in said cartridge between said two spaced sides, two spaced openings in one side of said two spaced sides of said cartridge, each of said spaced openings being elongated openings parallel to one another and each having an outermost edge extending substantially to the outer periphery of said circular cleaning sheet, one of said two spaced openings being an opening which provides access to said cleaning sheet for a read/write head of said floppy disc drive and a shutter means moveably mounted on said cartridge between an open position and a closed position, said shutter means having two spaced shutter sections being parallel to said one side of said cartridge, said two spaced shutter sections respectively closing said two spaced openings in said one side of said cartridge to thereby isolate said cleaning sheet within said cartridge and thereby protect said cleaning sheet from dust and dirt when said shutter means is in said closed position, said two spaced shutter sections being positioned to expose spaced portions of said cleaning sheet juxtaposed to each of said two spaced openings when said shutter means is in said open position to enable application of a cleaning fluid through each of said spaced openings to each of said spaced portions and to provide for cleaning the head of said floppy disc drive when the cleaning device is inserted in said floppy disc drive, said shutter means when in said open position providing access to said cleaning sheet by said read/write head via said one of said two spaced openings.

14. A head cleaning device for a floppy disc drive comprising a circular cleaning sheet having a central hole with a hub plate disposed in said hole, a cartridge in which said cleaning sheet is disposed, said cartridge having two spaced sides, said cleaning sheet being rotatable in said cartridges between said two spaced sides, spaced openings in one side of said two spaced sides of said cartridge, one of said spaced openings being an opening which provides access to said cleaning sheet for a read/write head of said floppy disc drive, and shutter means moveably mounted on said cartridge between an open position and a closed position, said shutter means in said closed position closing each of said spaced openings to thereby isolate said cleaning sheet within said cartridge and thereby protect said cleaning sheet from dust and dirt, said shutter means in said open position exposing spaced portions of said cleaning sheet juxtaposed to each of said spaced openings to enable application of a cleaning fluid to each of said spaced portions to provide for cleaning the head of said floppy disc drive when the cleaning device is inserted in said floppy disc drive, said shutter means when in said open position providing access to said cleaning sheet by said read/write head through said one of said spaced openings, said shutter means having a generally U-shaped configuration with two spaced leg sections disposed in superimposed relationship with said two spaced sides of said cartridge, each of said spaced leg sections having a window which is generally aligned with said one of said openings when said shutter means is in said open position.

15. A head cleaning device for a floppy disc drive comprising a circular cleaning sheet having a central hole with a hub plate disposed in said hole, a cartridge in which said cleaning sheet is disposed, said cartridge having a generally square configuration with linear edges said cartridge having two spaced sides, said cleaning sheet being rotatably mounted about an axis in said cartridge between said two spaced sides, spaced openings in one side of said two spaced sides of said cartridge, one of said spaced openings being an opening which provides access to said cleaning sheet for a read/write head of said floppy disc drive and a U-shaped shutter means slidable linearly along one of said linear edges between an open position and a closed position, said shutter means having a generally U-shaped configuration with two spaced leg panels disposed in superimposed relationship with said two spaced sides of said cartridge, one of said leg panels closing each of said spaced openings when said shutter means is in said closed position to thereby protect said cleaning sheet from dust and dirt, said one of said leg panels exposing spaced portions of said cleaning sheet juxtaposed to each of said spaced openings when said shutter means is in said open position to enable application of a cleaning fluid to each of said spaced portions and to provide for cleaning the head of said floppy disc drive when the cleaning device is inserted in said floppy disc drive, said one of said leg panels providing access to said cleaning sheet by said read/write head through said one of said spaced openings when said shutter means is in said open position, an aperture in the other of said two spaced sides of said cartridge disposed in superimposed relationship with said one of said spaced openings in said one side of said cartridge, the other leg panel closing said aperture when said shutter means is in said closed position, said other leg panel exposing said aperture when said shutter means is in said open position.

16. A head cleaning device according to claim 15 wherein said aperture is substantially the same size as said one of said spaced openings.

17. A head cleaning device according to claim 15, wherein said aperture is an elongated aperture having an elongate axis radially disposed relative to the axis of said circular cleaning sheet.

18. A head cleaning device according to claim 15, wherein said shutter means travels along a linear path in moving between its closed and open positions, said one of said leg panels having a terminating edge perpendicular to said linear path, said one of said leg panels having a window spaced from said terminating edge with a section between said terminating edge and said window being designated a cover panel portion, said cover panel portion covering the other of said spaced openings when said shutter means is in said closed position, said cover panel portion being disposed between said one of said spaced openings and the other of said spaced openings in said one side of said cartridge when said shutter means is in said open position.

19. A head cleaning device for a floppy disc drive comprising a circular cleaning sheet having a central hole with a hub plate disposed in said hole, a cartridge in which said cleaning sheet is disposed, said cartridge having two spaced sides, said cleaning sheet being rotatable in said cartridge between said two spaced sides, spaced openings in one side of said two spaced sides of said cartridge, one of said spaced openings being an opening which provides access to said cleaning sheet for a read/write head of said floppy disc, drive and shutter means moveably mounted on said cartridge between an open position and a closed position, said shutter means having a generally U-shaped cross-sectional configuration having two spaced leg sections, said cartridge having an edge portion disposed in said U-shaped cross-sectional configuration between said two spaced leg sections, one of said leg sections closing each of said spaced openings when said shutter means is in said closed position to thereby isolate said cleaning sheet within said cartridge and thereby protect said cleaning sheet from dust and dirt, said one of said leg sections exposing spaced portions of said cleaning sheet juxtaposed to each of said spaced openings when said shutter means is in said open position to enable application of a cleaning fluid to each of said spaced portions and to provide for cleaning the head of said floppy disc drive when the cleaning device is inserted in said floppy disc drive, said one of said leg sections providing access to said cleaning sheet by said read/write head through said one of said spaced openings when said shutter means is in said open position, an aperture in the other of said two spaced sides of said cartridge disposed in superimposed relationship with said one of said spaced openings in said one side of said cartridge, the other of said leg section closing said aperture when said shutter means is in said closed position, said other of said leg sections exposing said aperture when said shutter means is in said open position.

* * * * *